United States Patent
Hung

(10) Patent No.: US 12,397,636 B2
(45) Date of Patent: Aug. 26, 2025

(54) TRANSMISSION SYSTEM FOR ATV

(71) Applicant: TAIWAN GOLDEN BEE CO., LTD., Kaohsiung (TW)

(72) Inventor: Mu-Chen Hung, Kaohsiung (TW)

(73) Assignee: TAIWAN GOLDEN BEE CO., LTD., Kaohsiung (TW)

( * ) Notice: Subject to any disclaimer, the term of this patent is extended or adjusted under 35 U.S.C. 154(b) by 523 days.

(21) Appl. No.: 18/077,474

(22) Filed: Dec. 8, 2022

(65) Prior Publication Data

US 2024/0190242 A1    Jun. 13, 2024

(51) Int. Cl.
| | |
|---|---|
| *B60K 17/35* | (2006.01) |
| *B60K 17/354* | (2006.01) |
| *B60K 23/08* | (2006.01) |
| *F16H 48/24* | (2006.01) |

(52) U.S. Cl.
CPC ............ *B60K 17/35* (2013.01); *B60K 17/354* (2013.01); *B60K 23/08* (2013.01); *B60K 2023/0858* (2013.01); *B60Y 2200/124* (2013.01)

(58) Field of Classification Search
CPC ...... B60K 17/35; B60K 17/354; B60K 23/08; B60K 2023/0858; F16H 48/23; F16H 48/38; F16H 63/32; F16H 2063/322
See application file for complete search history.

(56) References Cited

U.S. PATENT DOCUMENTS

| | | | |
|---|---|---|---|
| 6,432,020 B1* | 8/2002 | Rivera ................... | F16H 48/08 |
| | | | 475/231 |
| 2005/0173180 A1* | 8/2005 | Hypes ................... | B60K 17/16 |
| | | | 475/2 |
| 2010/0144478 A1* | 6/2010 | Fan ........................ | F16H 48/30 |
| | | | 475/231 |
| 2021/0207696 A1* | 7/2021 | Cheng ................... | F16H 48/34 |
| 2025/0144998 A1* | 5/2025 | Cheng ................... | B60K 17/02 |

FOREIGN PATENT DOCUMENTS

| | | | | |
|---|---|---|---|---|
| CN | 204488496 U | * | 7/2015 | |
| DE | 102020211807 A1 | * | 3/2022 | ........... F16H 63/304 |
| EP | 4382773 A1 | * | 6/2024 | ............. B60K 17/02 |

* cited by examiner

*Primary Examiner* — Anne Marie M Boehler

(74) *Attorney, Agent, or Firm* — Muncy, Geissler, Olds & Lowe, P.C.

(57) ABSTRACT

A transmission system of an all-terrain vehicle (ATV) includes a transmission unit including a driving module that includes two axles and a differential connected to the axles, and a switching unit including a differential switching mechanism that includes a bifurcate fork connected to the differential and that has an elongated groove being elongated in a front-rear direction, a connecting pin parallel to the axles, extending through the bifurcate fork, and connected fixedly to the differential, an actuating shaft extending into the elongated groove, and an actuating motor driving the actuating shaft to rotate, thereby driving the bifurcate fork to move along the connecting pin via connection between the elongated groove and the actuating shaft and switching the differential between lock and unlock states.

7 Claims, 8 Drawing Sheets

TRANSMISSION SYSTEM FOR ATV

FIELD

The disclosure relates to a power transmission system, and more particularly to a transmission system to be mounted to an all-terrain vehicle (ATV).

BACKGROUND

Generally, a vehicle includes an engine, four wheels, a differential, and a conventional transmission system. The wheels are driven to rotate by the engine through power transmission performed by the conventional transmission system so the vehicle is driven to move. The differential is operable to be switched between a lock state and an unlock state by the conventional transmission system so as to facilitate turning of the vehicle. Furthermore, for a vehicle having a relatively good performance, e.g., a sport utility vehicle (SUV), a conventional transmission system thereof may further switch an operation mode of the vehicle between a four-wheel drive mode and a two-wheel drive mode.

The conventional transmission system employs a cable-operated mechanism to switch the differential between the lock and unlock states and to switch the operation mode of the vehicle. However, a cable of the cable-operated mechanism may be bent when being assembled in the vehicle, and upon operation of the conventional transmission system, a reaction period is necessary for the cable to be pulled straight in order to drive other components in the cable-operated mechanism to switch the differential and the operation mode of the vehicle. Consequently, the vehicle may not react immediately upon switching of the differential and the operation mode, which may adversely affect the driving experience and performance of the vehicle, and safety issues during driving may even occur.

SUMMARY

Therefore, an object of the disclosure is to provide a transmission system that can alleviate at least one of the drawbacks of the prior art.

According to the disclosure, a transmission system adapted to be mounted to an engine of an all-terrain vehicle (ATV) is provided. The transmission system includes a transmission unit and a switching unit. The transmission unit includes two driving modules spaced apart from each other in a front-rear direction. One of the driving modules is adapted to be connected to and driven by the engine. Each of the driving modules includes a differential and two axles. The axles extend away from each other from the differential and are perpendicular to the front-rear direction. The differential includes a differential lock that is operable to switch the differential between a lock state, where the axles are driven to rotate at the same speed, and an unlock state, where the axles are allowed to rotate at different speeds. The switching unit includes two differential switching mechanisms. Each of the differential switching mechanisms is connected to the differential of a respective one of the driving modules for switching the differential between the lock state and the unlock state. Each of the differential switching mechanisms includes a bifurcate fork, a connecting pin, an actuating shaft, and an actuating motor. For each of the differential switching mechanisms, the bifurcate fork is connected to the differential of the respective one of the driving modules and has an elongated groove being elongated in the front-rear direction, the connecting pin is parallel to the axles, extends through the bifurcate fork, and is connected fixedly to the differential lock of the differential of the respective one of the driving modules, the bifurcate fork is movable along the connecting pin, the actuating shaft includes a first portion extending into the elongated groove of the bifurcate fork, and a second portion connected co-rotatably to the first portion and extending away from the elongated groove in an up-down direction that is perpendicular to the front-rear direction and the axles, and the actuating motor is connected to the second portion of the actuating shaft for driving the second portion to rotate, thereby driving the bifurcate fork to move along the connecting pin via connection between the elongated groove and the first portion of the actuating shaft and switching the differential of the respective one of the driving modules between the lock state and the unlock state.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
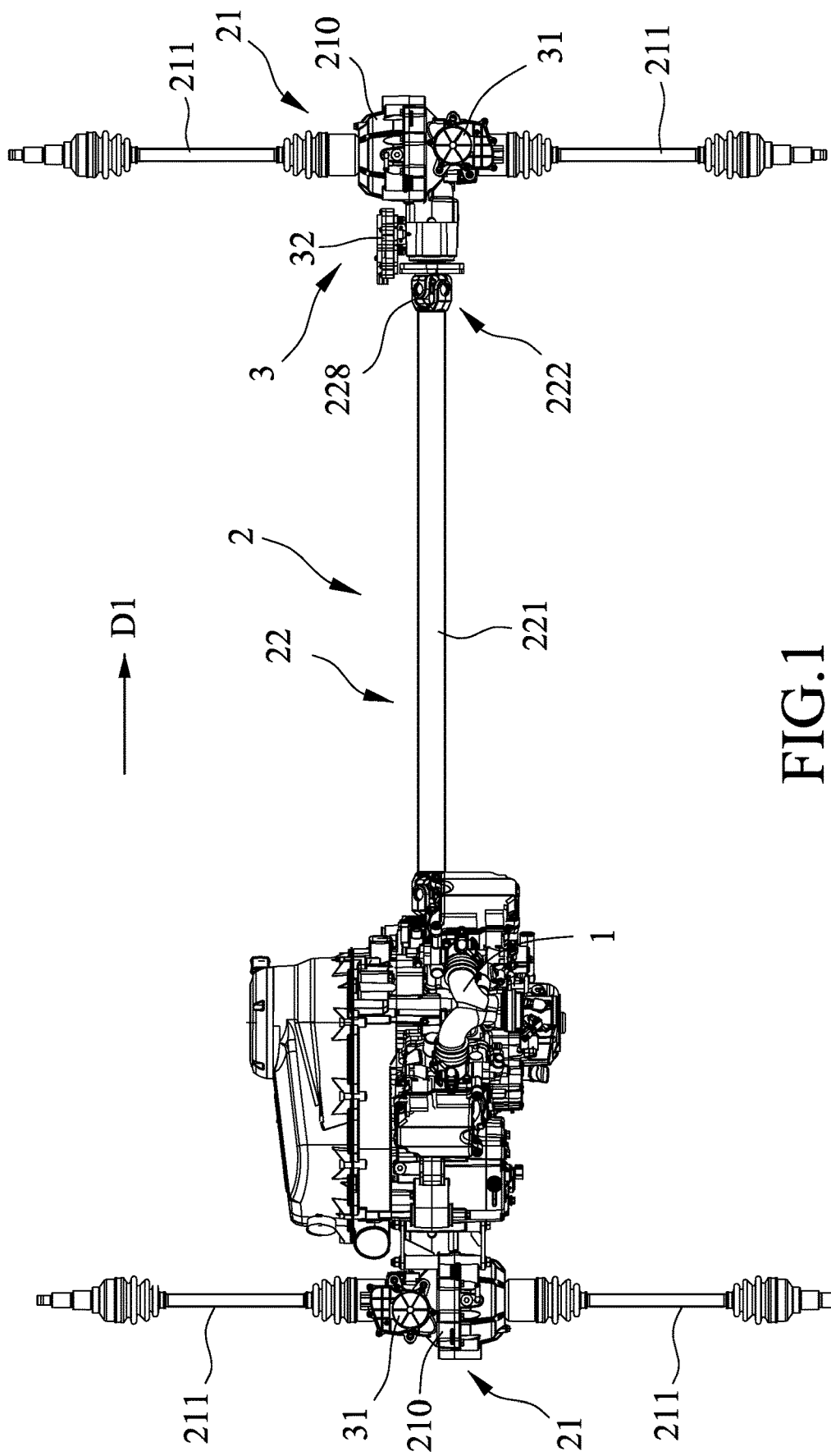
FIG. 1 is a top view of a transmission system of an embodiment according to the present disclosure to be mounted to an all-terrain vehicle (ATV).

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, a transmission system of the embodiment according to the present disclosure is adapted to be mounted to an engine 1 of an all-terrain vehicle (ATV, not fully drawn in FIG. 1). The transmission system includes a transmission unit 2 and a switching unit 3. The switching unit 3 is connected to the transmission unit 2. In this embodiment, the ATV includes four wheels (not shown) and two of the wheels are disposed at the front and the remaining two of the wheels are disposed at the rear in the front-rear direction (D1).

Figure 2:
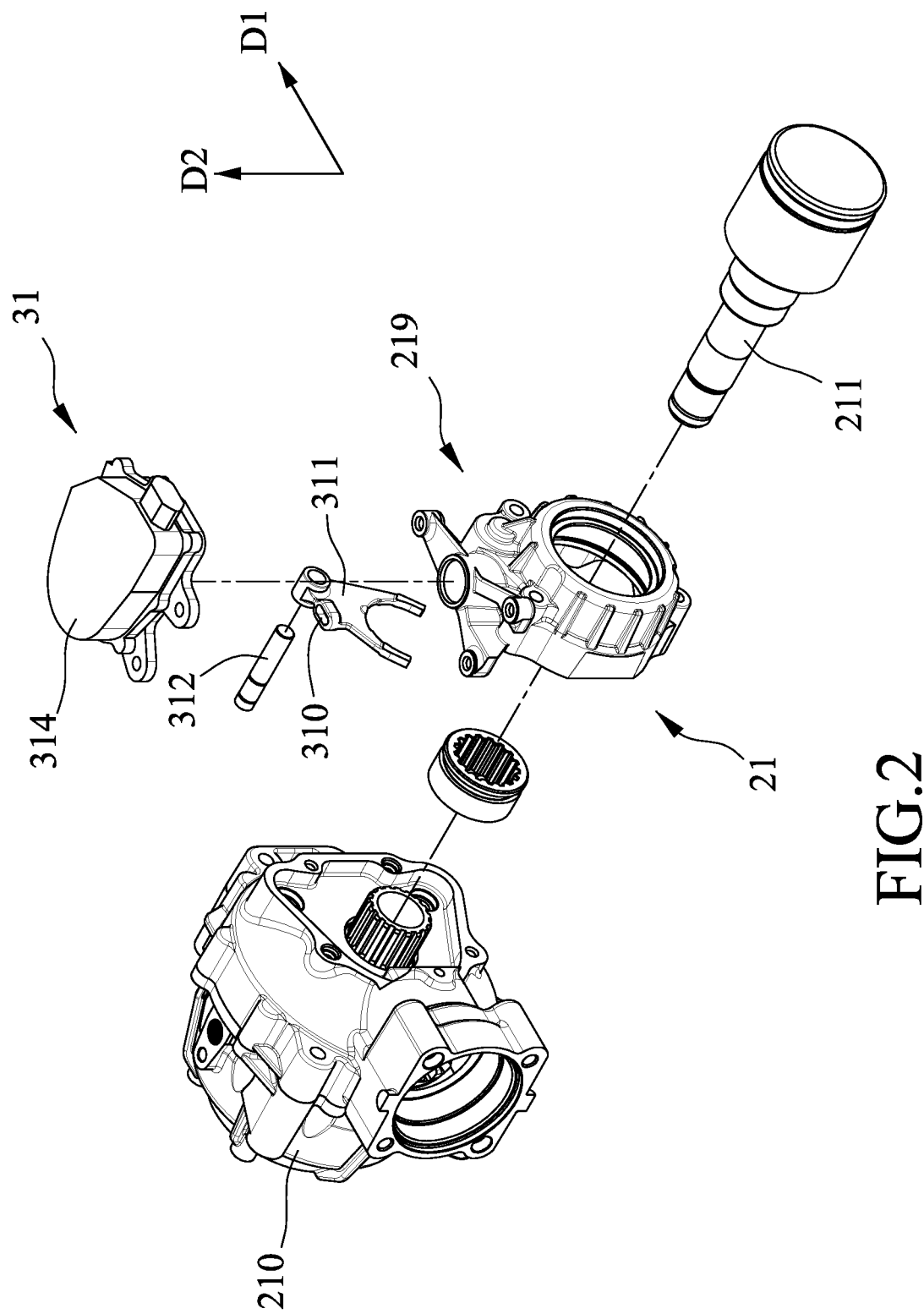
FIG. 2 is a partly exploded perspective view of a driving module and a differential switching mechanism of the embodiment.

Further referring to FIG. 2, the transmission unit 2 includes two driving modules 21 and a transmission module 22. The driving modules 21 are spaced apart from each other in the front-rear direction (D1), and each of the driving modules 21 includes a differential 210 and two axles 211 extending away from each other from the differential 210, perpendicular to the front-rear direction (D1) and connected respectively to two of the wheels. The transmission module 22 is adapted to be disposed between the engine 1 and the differential 210 of a front one of the driving modules 21 in the front-rear direction (D1). Each of the differentials 210 of the driving modules 21 includes a plurality of meshing epicyclic gears (not shown) for realizing a differential function, i.e., to allow the axles 211 to rotate at different speeds. Since the main feature of the present disclosure does not reside in the structures of the differentials 210, further details of how the epicyclic gears drive the axles 211 are omitted for the sake of brevity. The differential 210 of each of the driving modules 21 includes a differential lock 219 that is operable to switch the differential 210 between a lock state, where the axles 211 are driven to rotate at the same speed, and an unlock state, where the axles 211 are allowed to rotate at different speeds. Since how the axles 211 are respectively connected to the wheels so the ATV is moving when the axles 211 are rotating is known in the art, further details of the same are omitted for the sake of brevity. In this embodiment, the differential 210 of a rear one of the driving modules 21 of the transmission module 2 in the front-rear direction (D1) is adapted to be connected directly to the engine 1. That is to say, the ATV to which the transmission system of the embodiment is mounted is a rear wheel drive vehicle, and the ATV is depicted and exemplified as a rear wheel drive vehicle model in the following description.

The transmission module 22 includes a drive shaft 221 that is adapted to be connected to the engine 1, and a connecting unit 222 that is disposed between the drive shaft 221 and the differential 210 of the front one of the driving modules 21, and that is connected to the drive shaft 221. Further referring to FIG. 3, the connecting unit 222 of the transmission module 22 of the transmission unit 2 includes a universal joint 228 (see FIG. 1) connected to the drive shaft 221, and a spline joint 229 connected to the universal joint 228. The drive shaft 221 serves as a universal drive shaft for transmitting rotary force by virtue of the universal joint 228 connected thereto. The drive shaft 221 is detachably connected to the differential 210 of the front one of the driving modules 21 through the spline joint 229 such that the connecting unit 222 is switched between a four-wheel drive mode and a two-wheel drive mode. Further details of the four-wheel drive mode and two-wheel drive mode are be described later in the following.

The switching unit 3 includes two differential switching mechanisms 31 and a synchronizing switching mechanism 32. Each of the differential switching mechanisms 31 is connected to the differential 210 of a respective one of the driving modules 21 for switching the differential 210 between the lock state and the unlock state. The synchronizing switching mechanism 32 is operable to switch the connecting unit 222 between the four-wheel drive mode and the two-wheel drive mode.

Figure 4:
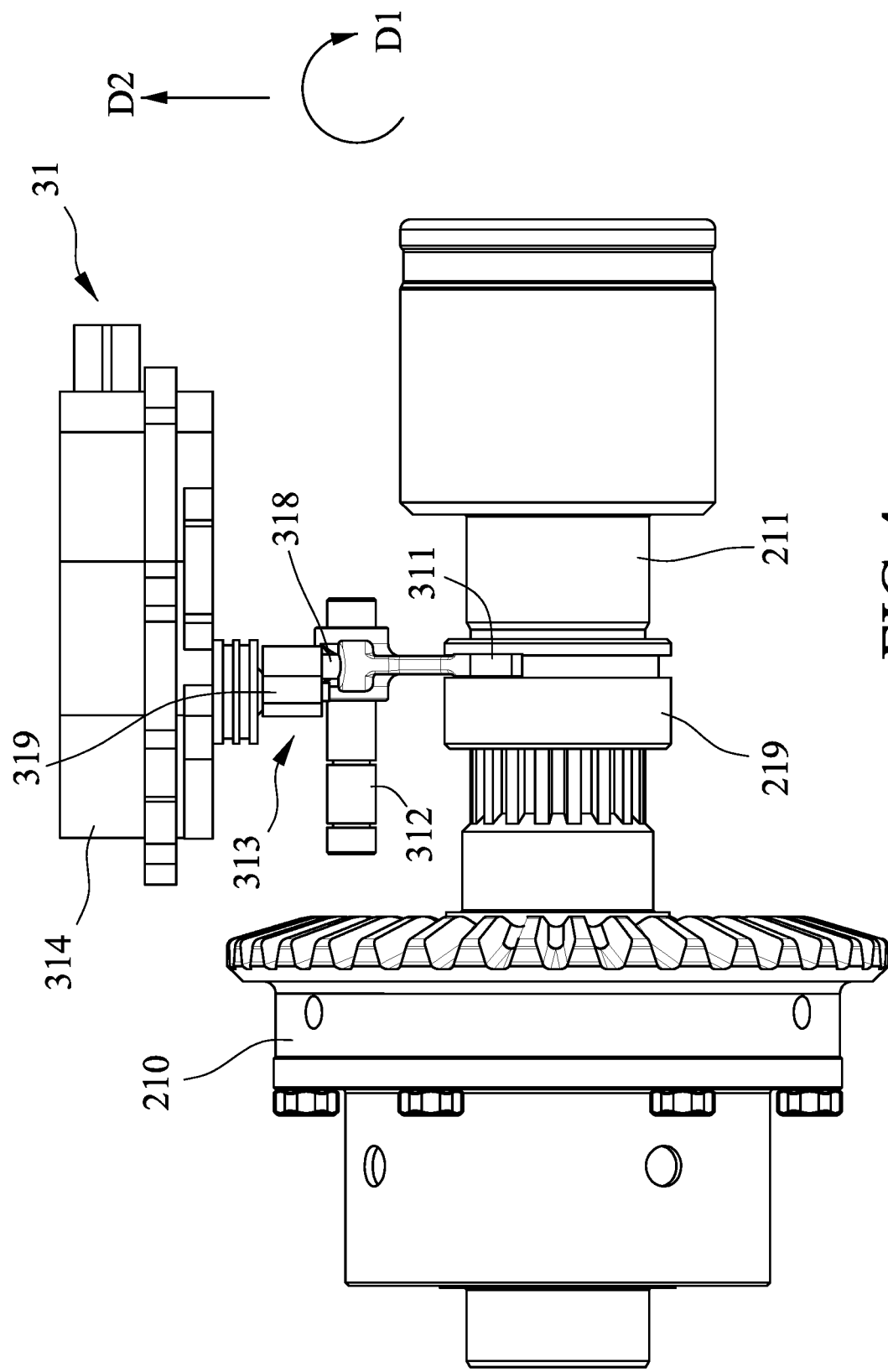
FIG. 4 is a schematic view illustrating the differential switching mechanism of the embodiment.
Figure 5:
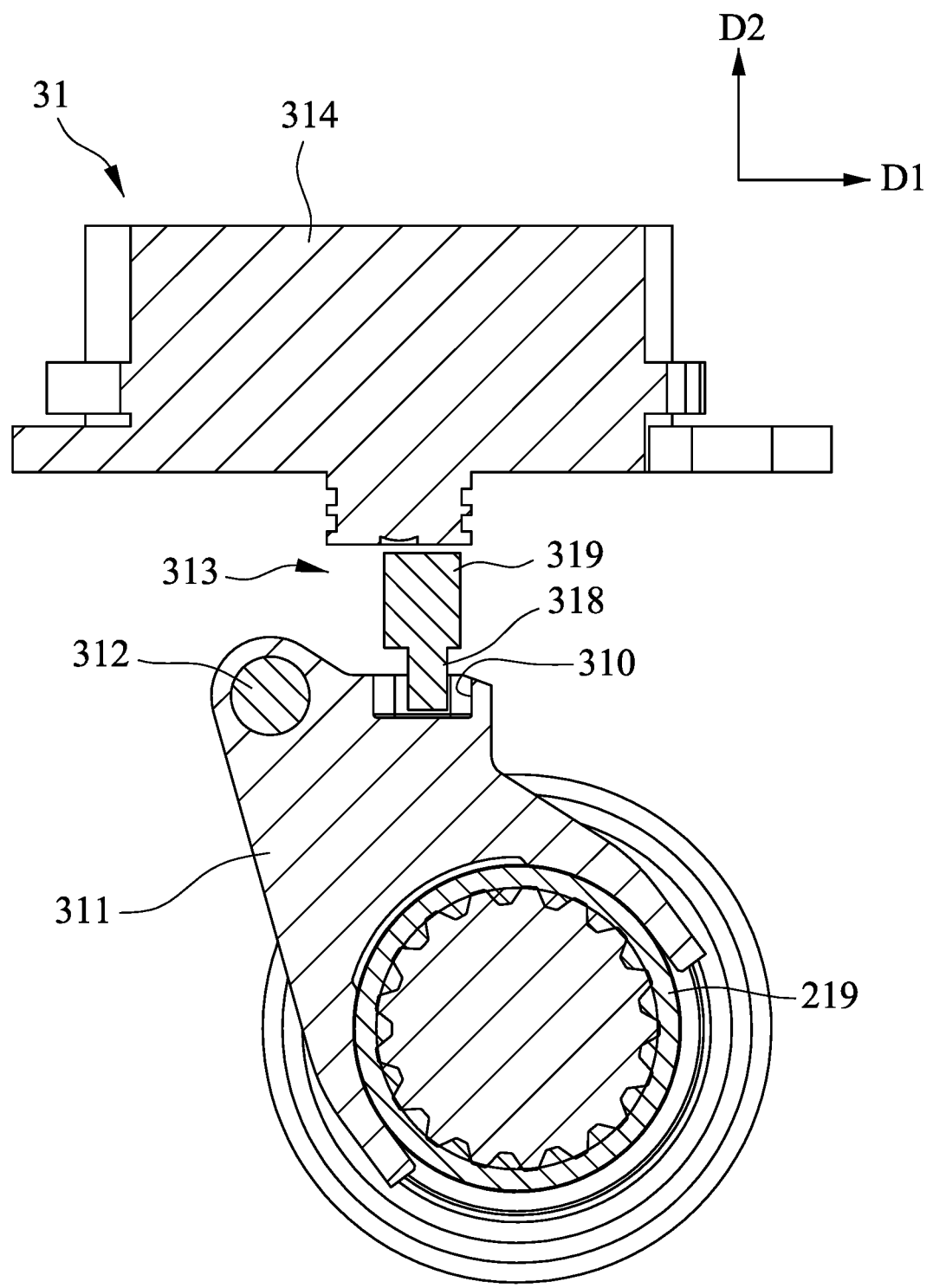
FIG. 5 is a sectional rear view illustrating the structure of the differential switching mechanism.
Figure 6:
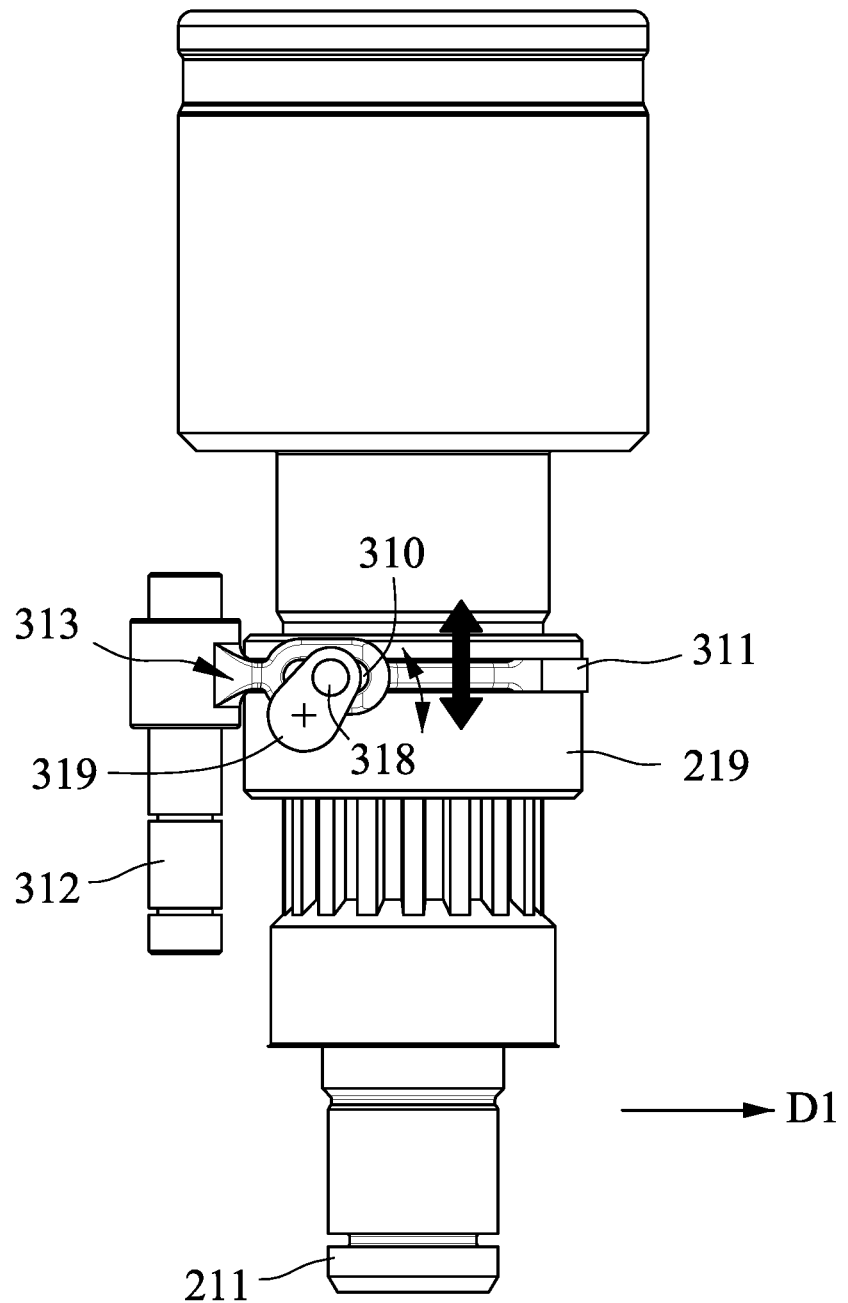
FIG. 6 is a schematic top view illustrating the structure and movement of the differential switching mechanism.

Further referring to FIG. 4, each of the differential switching mechanisms 31 includes a bifurcate fork 311 that is connected to the differential 210 of the respective one of the driving modules 21, and that has an elongated groove 310 being elongated in the front-rear direction (D1), a connecting pin 312 that is parallel to the axles 211, that extends through the bifurcate fork 311, and that is connected fixedly to the differential lock 219 of the differential 210 of the respective one of the driving modules 21, an actuating shaft 313 that includes a first portion 318 and a second portion 319, and an actuating motor 314 that is connected to the second portion 319 of the actuating shaft 313 for driving the second portion 319 to rotate. For each of the differential switching mechanisms 31, the bifurcate fork 311 is movable along the connecting pin 312, the first portion 318 of the actuating shaft 313 extends into the elongated groove 310 of the bifurcate fork 311, and the second portion 319 is connected co-rotatably to the first portion 318 and extends away from the elongated groove 310 in an up-down direction (D2) that is perpendicular to the front-rear direction (D1) and the axles 211. To switch the differential 210 of each of the driving modules 21, for the respective one of the differential switching mechanisms 31, the actuating motor 314 is energized so the bifurcate fork 311 is driven to move along the connecting pin 312 via connection between the elongated groove 310 and the first portion 318 of the actuating shaft 313, thus switching the differential 210 between the lock state and the unlock state. Further referring to FIGS. 5 and 6, the actuator motor 314 of each of the differential switching mechanisms 31 is a direct current motor. In this embodiment, the actuating motor 314 of each of the differential switching mechanisms 31 is equipped with a certain number of nodes in advance that are disposed in a gear set of the actuating motor 314 so a rotation angle of the actuator motor 314 and thus a rotation angle of the second portion 319 of the actuating shaft 313 are controlled to be within a predetermined range.

Figure 3:
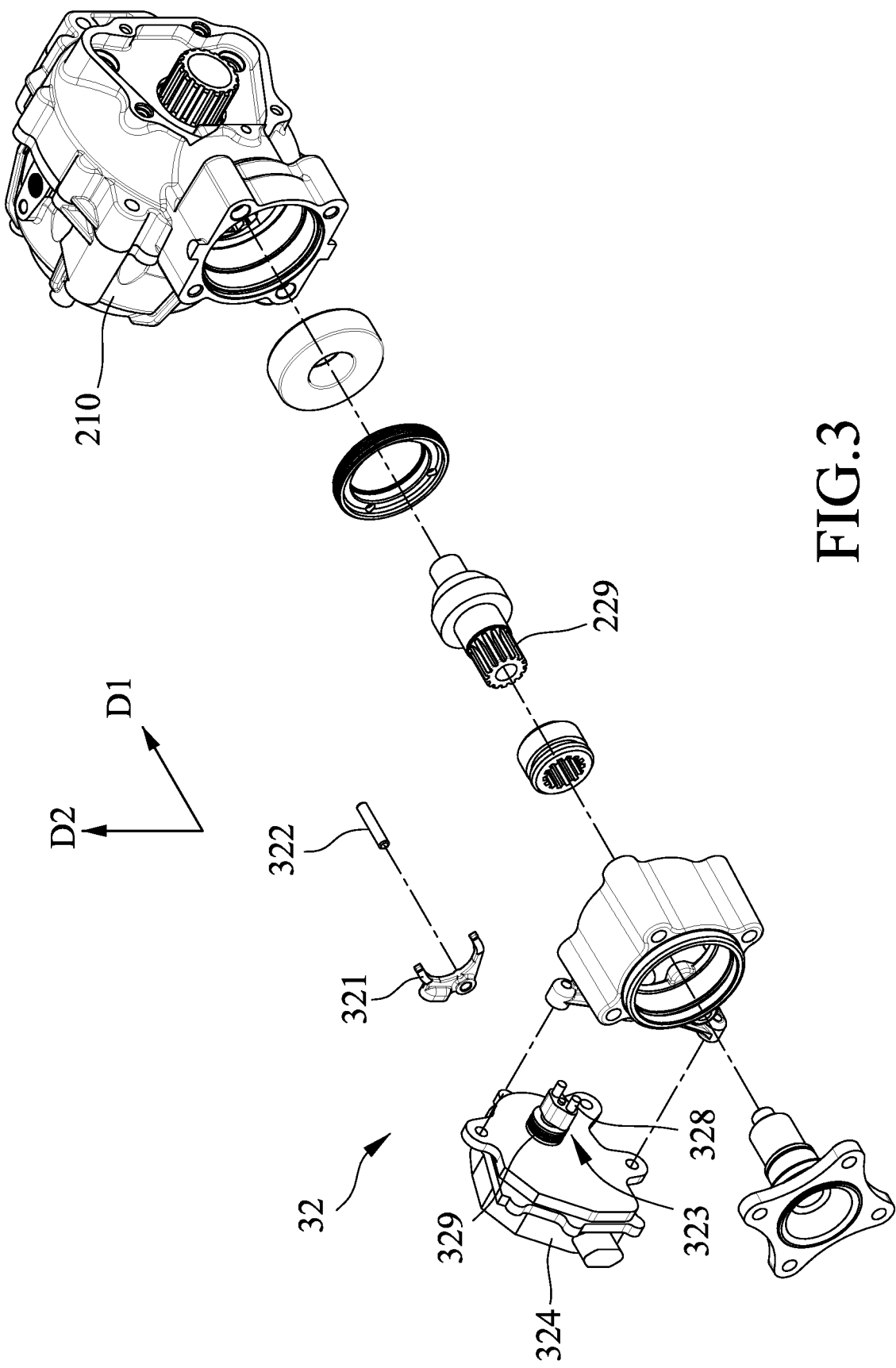
FIG. 3 is a partly exploded perspective view of the driving module and a synchronizing switching mechanism of the embodiment.
Figure 7:
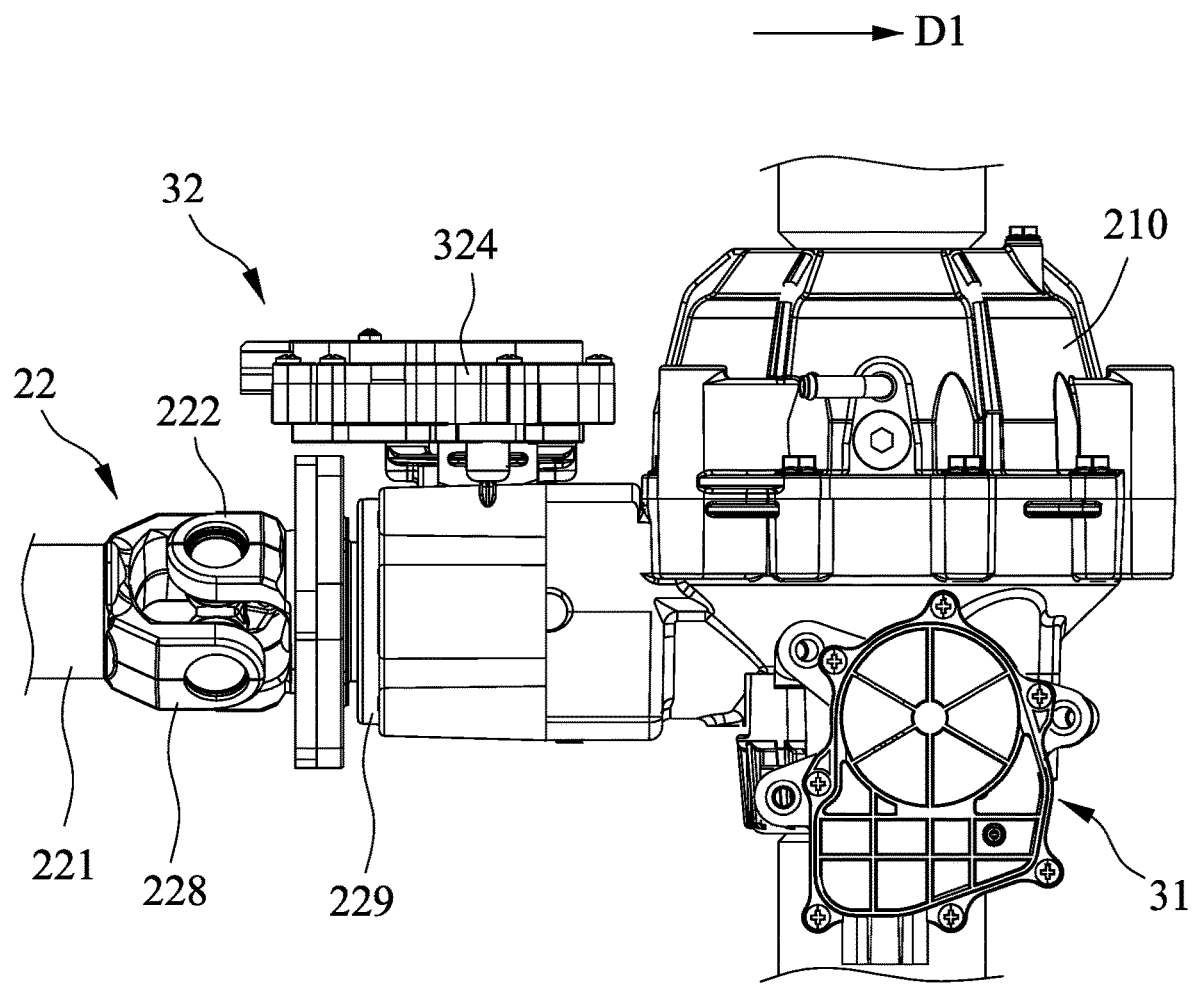
FIG. 7 is a fragmentary schematic top view illustrating the structure of the synchronizing switching mechanism.
Figure 8:
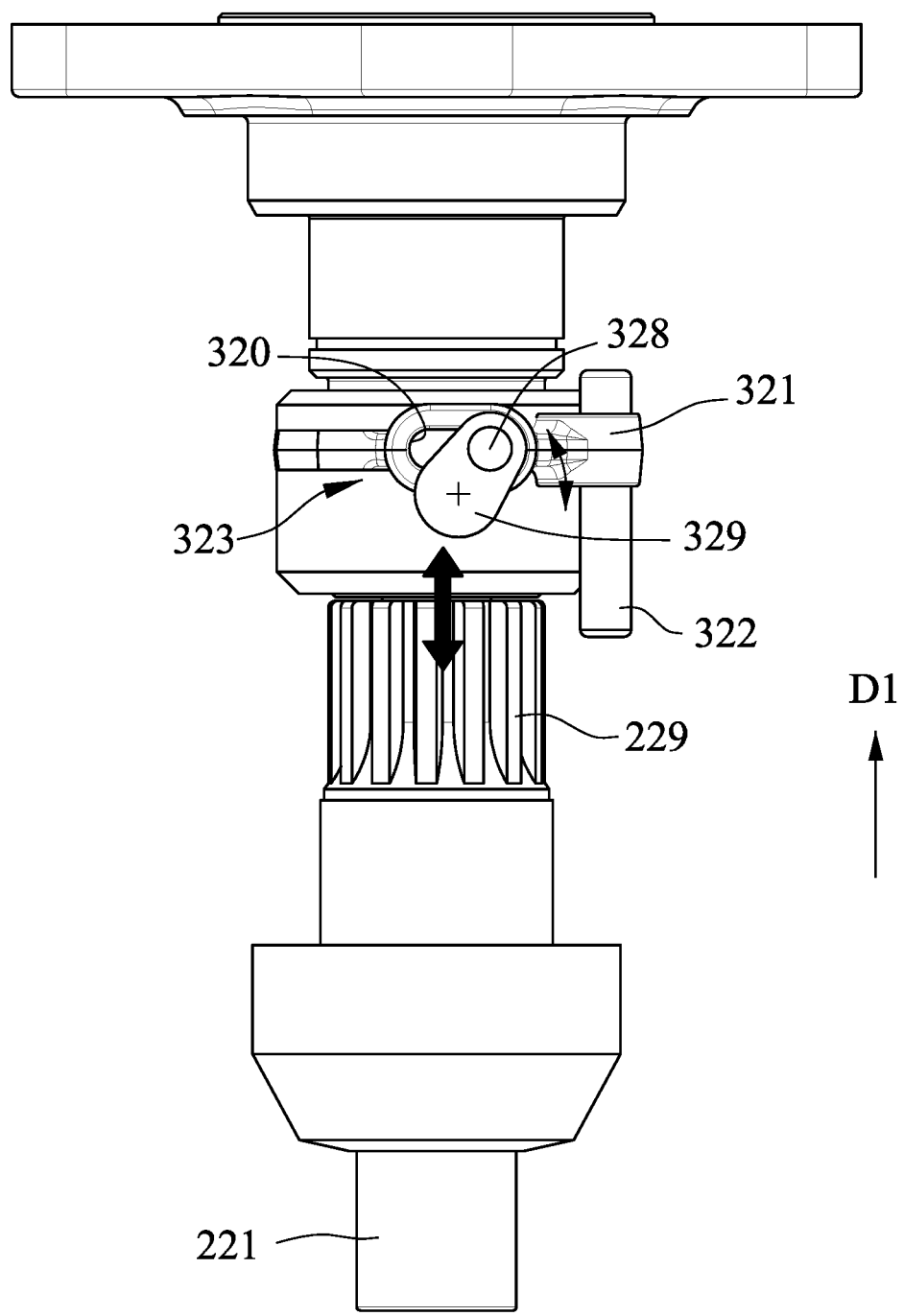
FIG. 8 is a fragmentary schematic side view illustrating the structure and movement of the synchronizing switching mechanism.

Referring to FIGS. 3, 7 and 8, the synchronizing switching mechanism 32 of the switching unit 3 is operable to switch the connecting unit 222 between the four-wheel drive mode, where the connecting unit 222 is connected to the differential 210 of the front one of the driving modules 21 such that the axles 211 of the front one of the driving modules 21 are adapted to be driven by the engine 1 through the drive shaft 221 and the connecting unit 222, and the two-wheel drive mode, where the connecting unit 222 is disconnected from the differential 210 of the front one of the driving modules 21. The structure of the synchronizing switching mechanism 32 is similar to that of each of the differential switching mechanisms 31 and is operated in a similar manner. Specifically, the synchronizing switching mechanism 32 includes a clamping fork 321 that is connected to the connecting unit 222 and that has a guide groove 320 being elongated in the up-down direction (D2), a positioning pin 322 that is connected fixedly to the differential 210 of the front one of the driving modules 21 and that extends in the first direction (D1) through the clamping fork 321, the clamping fork 321 being movable along the positioning pin 322, a driving shaft 323 that extends parallel to the axles 211 and that includes a first portion 328 and a second portion 329, and a drive motor 324 that is connected to the second portion 329 of the driving shaft 323 for driving the second portion 329 to rotate. The first portion 328 of the driving shaft 323 extends into the guide groove 320 of the clamping fork 321, and the second portion 329 of the driving shaft 323 is connected co-rotatably to the first portion 328 of the driving shaft 323 and is opposite to the guide groove 320. When the drive motor 324 is energized, the clamping fork 321 is driven to move along the positioning pin 322 via connection between the guide groove 320 and the first portion 328 of the driving shaft 323 and the connecting unit 222 is switched between the four-wheel drive mode and the two-wheel drive mode. In this embodiment, the drive motor 324 of the synchronizing switching mechanism 32 is a direct current motor. The spline joint 229 is connected to the differential 210 of the front one of the driving modules 21 when the connecting unit 222 is in the four-wheel drive mode, and is disconnected from the differential 210 of the front one of the driving modules 21 when the connecting unit 222 is in the two-wheel drive mode.

By virtue of the switching unit 3, the connecting unit 222 may be switched between the two-wheel drive mode and the four-wheel drive mode, and the differential 210 of each of the driving modules 21 may be switched by the differential lock 219 between the lock state and the unlock state. When the connecting unit 222 is in the two-wheel drive mode, the differential 210 of the rear one of the driving modules 21 may be switched between the lock state and the unlock state. When the connecting unit 222 is in the four-wheel drive mode, the differentials 210 of the driving modules 21 may be both switched to the lock state or the unlock state. Furthermore, when the connecting unit 222 is in the four-wheel drive mode, the differential 210 of the front one of driving modules 21 is switched to the unlock state while the differential 210 of the rear one of the driving modules 21 is switched to the lock state. It should be noted that when the connecting unit 222 is in the four-wheel drive mode, it is unreasonable in actual driving condition to switch the differential 210 of the front one of driving modules 21 to the lock state while the differential 210 of the rear one of the driving modules 21 is switched to the unlock state. That is to say, the ATV may be switched among five statuses so as to adopt to various road conditions. For example, in a general driving condition, the connecting unit 222 is switched to the two-wheel drive mode and the differential 210 of the rear one of the driving modules 21 is switched to the unlock state so turning of the ATV is facilitated when driving in an ordinary road condition. In another case where the connecting unit 222 is switched to the four-wheel drive mode and the differentials 210 are both switched to the unlock state, a torsion of the ATV is greater than that of the ATV in the two-wheel drive mode so as to provide a relatively good off-road driving experience while a smooth turning may also be achieved. In yet another case where the ATV is stuck or trapped, the connecting unit 222 is switched to the four-wheel drive mode and the differentials 210 are both switched to the lock state so as to provide a relatively great torsion, thus enabling the ATV to escape.

In summary, in the transmission system of the embodiment according to the present disclosure mounted to the ATV, the connecting unit 222 and the differential 210 of each of the driving modules 21 are switched respectively through rotations of the driving motor 324 and the actuating motor 314, wherein the driving motor 324 and the actuating motor 314 rotate in relatively short stroke and respectively drive the clamping fork 321 and the bifurcate fork 311 of the respective one of the differential switching mechanisms 31 to move via connections respectively between the guide groove 320 and the first portion 328 of the driving shaft 323, and between the elongated groove 310 and the first portion 318 of the actuating shaft 313. Thus, as compared to the conventional transmission system that employs a cable-operated mechanism to switch the differential and the operation mode of the vehicle, the transmission system of the disclosure may immediately switch the connecting unit 222 and the differential 210 of each of the driving modules 21 to an appropriate one of the five statuses with a shorter reaction period.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A transmission system adapted to be mounted to an engine of an all-terrain vehicle (ATV), said transmission system comprising:
 a transmission unit that includes two driving modules spaced apart from each other in a front-rear direction, one of said driving modules being adapted to be connected to and driven by the engine, each of said driving modules including
  a differential, and
  two axles extending away from each other from said differential and perpendicular to the front-rear direction, said differential including a differential lock that is operable to switch said differential between a lock state, where said axles are driven to rotate at the same speed, and an unlock state, where said axles are allowed to rotate at different speeds; and
 a switching unit that includes two differential switching mechanisms, each of said differential switching mechanisms being connected to said differential of a respective one of said driving modules for switching said differential between the lock state and the unlock state, each of said differential switching mechanisms including
  a bifurcate fork that is connected to said differential of the respective one of said driving modules, and that has an elongated groove being elongated in the front-rear direction,
  a connecting pin that is parallel to said axles, that extends through said bifurcate fork, and that is connected fixedly to said differential lock of said differential of the respective one of said driving modules, said bifurcate fork being movable along said connecting pin, an actuating shaft that includes:
   a first portion extending into said elongated groove of said bifurcate fork; and
   a second portion connected co-rotatably to said first portion and extending away from said elongated groove in an up-down direction that is perpendicular to the front-rear direction and said axles, and an actuating motor that is connected to said second portion of said actuating shaft for driving said second portion to rotate, thereby driving said bifurcate fork to move along said connecting pin via connection between said elongated groove and said first portion of said actuating shaft and switching said differential of the respective one of said driving modules between the lock state and the unlock state.

2. The transmission system as claimed in claim 1, wherein said differential of a rear one of said driving modules of said transmission module in the front-rear direction is adapted to be connected directly to the engine.

3. The transmission system as claimed in claim 2, wherein:
   said transmission unit further includes a transmission module adapted to be disposed between the engine and said differential of a front one of said driving modules, and including a drive shaft that is adapted to be connected to the engine, and a connecting unit that is disposed between said drive shaft and said differential of the front one of said driving modules, and that is connected to said drive shaft; and
   said switching unit further includes a synchronizing switching mechanism operable to switch said connecting unit between a four-wheel drive mode, where said connecting unit is connected to said differential of the front one of said driving modules such that said axles of the front one of said driving modules are adapted to be driven by the engine through said drive shaft and said connecting unit, and a two-wheel drive mode, where said connecting unit is disconnected from said differential of the front one of said driving modules.

4. The transmission system as claimed in claim 3, wherein said synchronizing switching mechanism of said switching unit includes:
   a clamping fork connected to said connecting unit and having a guide groove that is elongated in the up-down direction;
   a positioning pin connected fixedly to said differential of the front one of said driving modules and extending in the first direction through said clamping fork, said clamping fork being movable along said positioning pin;
   a driving shaft extending parallel to said axles, and including
      a first portion that extends into said guide groove of said clamping fork, and
      a second portion that is connected co-rotatably to said first portion and that is opposite to said guide groove; and
   a drive motor connected to said second portion of said driving shaft for driving said second portion to rotate, thereby driving said clamping fork to move along said positioning pin via connection between said guide groove and said first portion of said driving shaft and switching said connecting unit between the four-wheel drive mode and the two-wheel drive mode.

5. The transmission system as claimed in claim 3, wherein said connecting unit of said transmission module of said transmission unit includes a universal joint connected to said drive shaft, and a spline joint connected to said universal joint, connected to said differential of the front one of said driving modules when said connecting unit is in the four-wheel drive mode, and disconnected from said differential of the front one of said driving modules when said connecting unit is in the two-wheel drive mode.

6. The transmission system as claimed in claim 4, wherein said drive motor of said synchronizing switching mechanism is a direct current motor.

7. The transmission system as claimed in claim 1, wherein said actuator motor of each of said differential switching mechanisms is a direct current motor.

* * * * *